United States Patent [19]
Cowie

[11] 3,979,130
[45] Sept. 7, 1976

[54] SLEEVES

[75] Inventor: George Raymond Cowie, Middlesbrough, England

[73] Assignee: Fisons Limited, London, England

[22] Filed: July 31, 1975

[21] Appl. No.: 600,852

Related U.S. Application Data

[63] Continuation of Ser. No. 435,009, Jan. 21, 1974, abandoned, which is a continuation-in-part of Ser. No. 264,068, June 19, 1972, abandoned.

[30] Foreign Application Priority Data
June 18, 1971 United Kingdom............. 28626/71

[52] U.S. Cl................................ 277/208; 277/170; 277/DIG. 2; 277/212 F
[51] Int. Cl.²........................ F16L 19/00; F16J 9/00
[58] Field of Search ....... 277/207 R, DIG. 2, 212 F, 277/170, 211, 208

[56] References Cited
UNITED STATES PATENTS 2,396,491  3/1946  Chamberlain................. 277/DIG. 2
3,080,183  3/1963  Luertzing et al............... 277/DIG. 2

FOREIGN PATENTS OR APPLICATIONS
61,978   1/1940   Norway............................... 277/211
216,485  12/1941  Switzerland..................... 277/212 F

*Primary Examiner*—Samuel B. Rothberg
*Attorney, Agent, or Firm*—Wenderoth, Lind & Ponack

[57] ABSTRACT

An improved open ended frusto conical sleeve member suitable for use as a sealing interface between the co-operating mating surfaces of a tapered male/female push fit type glassware joint is disclosed. The sleeve member, which has a wall thickness of less than 1.5 mm includes at least two integral, generally circumferential ribs and an external annular flange for gripping during assembly and disassembly of a joint incorporating the sleeve member. The sleeve member, the ribs and the annular flange are constructed from a material having a static coefficient of friction of less than 0.2, a hardness of from 50 to 80 on the Shore D scale, and which is resistant to thermal degradation up to 200°C and to structural degradation when immersed in a corrosive chemical for 12 hours at 50°C.

9 Claims, 4 Drawing Figures

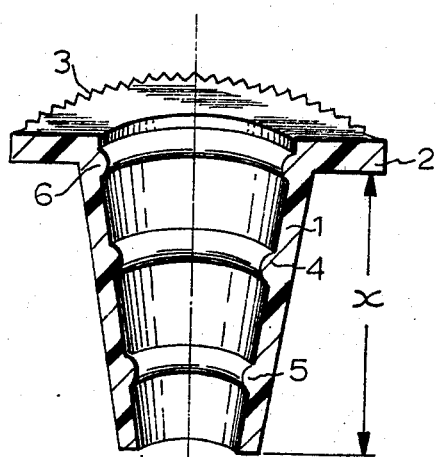
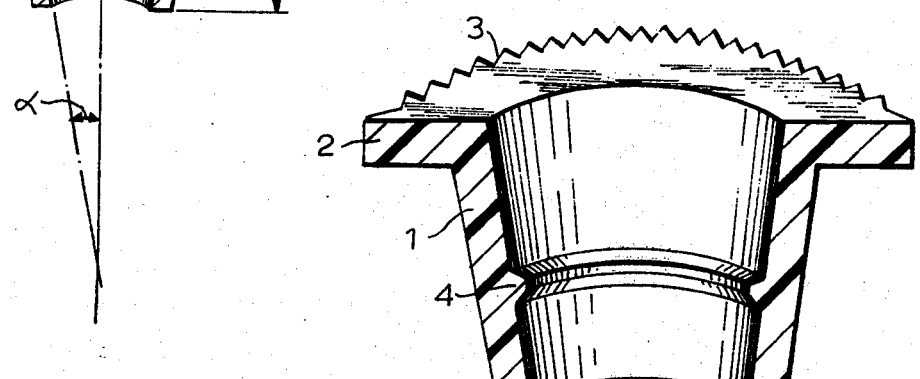
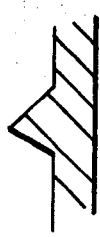
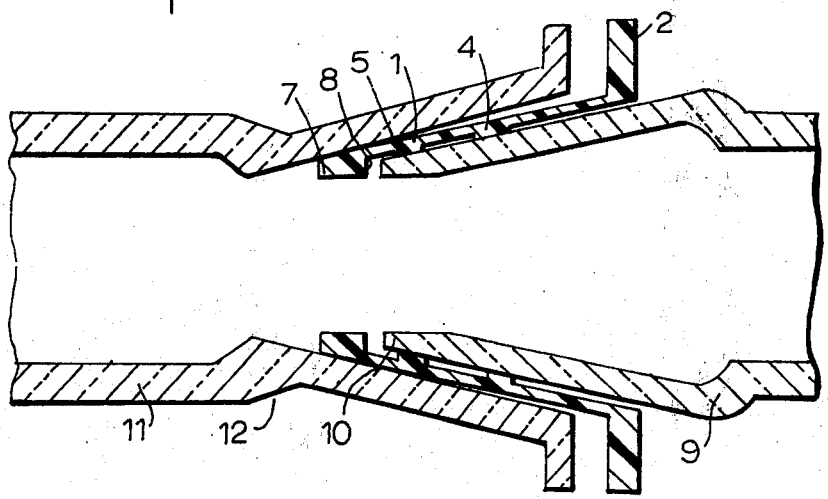
FIG. 1
FIG. 2
FIG. 4
FIG. 3

SLEEVES

This is a Continuation, of application Ser. No. 435,009, filed Jan. 21, 1974, now abandoned which is a Continuation-in-Part of application Ser. No. 264,068, filed June 19, 1972, now abandoned.

BACKGROUND OF THE INVENTION

The present invention relates to a sleeve member, notably to a sleeve member adapted for use as in interface between the surfaces of a male and female joint assembly.

Glass laboratory apparatus is conventionally provided with jointing means whereby any desired configuration of apparatus may be made up from constituent individual components. The joint means usually takes the form of a tapered socket or female part on one component and a corresponding tapered male part on another component which is push fitted into the female part, the internal surface of the taper on the female part and the external surface on the male part being accurately ground to ensure uniform mating surfaces which give a good fit between the two parts. This type of joint is termed a male/female push fit type joint herein. However, this form of joint often locks when assembled with the resultant risk of breakage during dismantling. In order to overcome this problem, a coating of grease has been applied to the contacting surfaces of the joint. However, this may lead to grease contamination of the materials flowing through the joint and this is especially true when the joint is subjected to vacuum, raised temperature and/or solvents. As an alternative it has been proposed to provide an interfacing sleeve of a plastic material, such as polytetrafluoroethylene, between the ground surfaces of the male and female parts. However, whilst such sleeves enable an assembled joint to be dismantled with comparative ease, they are difficult to remove from the joint members and are often distorted during removal. Furthermore, such a sleeve does not achieve a seal which is effective at high vacuum.

SUMMARY OF THE INVENTION

The present invention relates to an improved form of sleeve.

Accordingly, the present invention provides in an open ended frusto conical sleeve member having a wall thickness of less than 1.5 mm suitable for use as a sealing interface between the co-operating mating surfaces of a tapered male/female push fit type glassware joint, the improvements which comprise:

a. providing the interior surface of the sleeve member with at least two generally circumferential ribs integral therewith, the ribs having semi-circular, triangular or trapezoidal cross-section so as to assist dismantling of a joint incorporating the sleeve member;

b. providing an external integral annular flange at the broader end of the sleeve member whereby the sleeve member may be gripped during assembly and dismantling of a joint incorporating the sleeve member; and c. making the sleeve member, the ribs and the flange from a material which has the following properties i. has a static co-efficient of friction of less than 0.2
 ii. is not thermally degraded at temperatures up to 200°C.
 iii. has a modulus of elasticity in the range $80 \times 10^3$ to $200 \times 10^3$ pounds per square inch at 23°C.
 iv. has a hardness as measured on the Shore D scale of from 50 to 80.
 v. is not chemically or physically degraded when immersed in a corrosive chemical (as defined herein) for a period of 12 hours at 50°C.

It is preferred to form the sleeve member with as thin a wall as is feasible, e.g. 0.1 to 1, e.g. about 0.25 – 0.5 mms thick.

A particularly preferred form of the external flange is one having a square or rectangular section provided with a knurled edge to assist gripping thereof. The flange not only makes manipulation of the sleeve itself more convenient and provides a robust support for the comparatively fragile sleeve, but also provides a shoulder upon which pressure may be exerted to assist removal of the sleeve from the joint during dismantling thereof.

The sleeve member may also be provided with an internal thickening at its narrow end. This interior thickening serves to stiffen the end of the sleeve and also serves as a stop against which the tip of the male part of the joint buts, thus preventing the sleeve from being pushed too far onto the tapered male part and being distorted or torn.

The generally circumferential ribs on the inside wall of the sleeve are sealing ribs which are compressed between the co-operating faces of the parts of the joint when these parts are pushed together, so as to provide a substantially vacuum-tight seal. The use of two or more sealing ribs ensures comparatively even distribution of stresses within the assembled joint. These sealing ribs preferably lie between the ends of the sleeve, i.e. are non-terminal ribs. The ribs are located generally circumferentially on the sleeve and, whilst a rib may lie in a plane which is at an angle to the longitudinal axis of the sleeve, it is preferred that the plane be substantially at right angles to the longitudinal axis. The shape of the ribs is important that it has been found that other shaped ribs, e.g. saw toothed or lobed ribs, do not permit easy dismantling of a joint incorporating the sleeve member. Furthermore, the exterior surface of the male part of the joint should not have grooves into which the ribs engage since this will also prevent easy dismantling and may affect the seal which can be made.

It will be appreciated that the various dimensions for the sleeves of the invention may be varied to suit the type and size of joint in which they are to be used. In general the sleeve is formed so that it is substantially congruent with the interface between the male and female parts of the assembled joint, the thickness of the wall of the sleeve being the minimum compatible with ease of manufacture and tear strength. The circumferential sealing ribs on the sleeve notionally project through the surface of the male part which they contact when the sleeve is in position and joint assembled, in order that they may be compressed in the assembled joint.

The material from which the sleeve is made is crucial in that unless a material having the requisite properties is used the sleeve will either break down during use or fail to provide a satisfactory seal and yet be one which can be assembled and dismantled with ease. Thus, the material must possess the thermal stability quoted and be resistant to chemical attack. Its resistance to chemical attack is assessed by its ability to endure immersion in the following chemicals for 12 hours at 50°C: glacial acetic acid, sulphuric acid (95% $H_2SO_4$), hydrochloric acid of specific gravity 1.185, nitric acid (95% $HNO_3$), aqua regia, acetone, methylethylketone and ethanol.

The term corrosive chemicals is used herein to denote these chemicals.

Whilst the shape of the sealing ribs affects the ease of dismantling of a joint incorporating the sleeve, the sleeve itself must exhibit low friction properties so that the sleeve will slide into position within the joint and not lock on to the male or the female part of the joint prematurely. Thus, if a high friction material were used, the crowns of the sealing ribs would lock on the male part of the joint before this was fully home in the sleeve. Attempts to push the male part home so as to form a firm joint would distort the sleeve and lead to tearing of the sleeve and a poor seal. If the male part is not pushed home, the joint will be only loosely made and will not seal satisfactorily.

If the material of construction is too soft and flexible, the sleeve can easily be forced too far on to the male part of the joint and this results in a poor seal between the parts of the assembled joint in that the sleeve is not located correctly in the joint. Furthermore, if the material is too elastic the sleeve will be stretched out of position during assembly of the joint, even though it was correctly mounted at the outset.

We prefer to use a material which has the following characteristics

Is not thermally degraded at temperatures of up to 200°C.
Has a static coefficient of friction of less than 0.075.
Has a modulus of elasticity of $80 \times 10^3 - 90 \times 10^3$ psi at 23°C.
Has a hardness of 50–60 shore D.
Is resistant to the corrosive chemicals.

Suitable material for present use include certain of the halogenated hydrocarbon polymers, notably sintered fluorinated hydrocarbon polymers such as polytetrafluoroethylene, fluorinated ethylene/propylene copolymer, polymonochlorotrifluoroethylene and copolymers of ethylene with tetrafluoroethylene. If desired the polymer may be given an inert filler to increase its strength and abrasion resistance, e.g. glass fiber filled polytetrafluoroethylene may be used. However, it will be appreciated that the presence of the filler may alter the physical characteristics of the polymer composition, e.g. increase the hardness, and the filled composition must still be one which satisfies the requirements set out above.

The sleeves of the invention may be made by any suitable method, e.g. by moulding, milling or sintering or by a combination of these methods.

BRIEF DESCRIPTION OF DRAWINGS

A typical sleeve of the invention will be described by way of example with reference to the accompanying drawings in which;

FIGS. 1 and 2 are vertical sections through two forms of the sleeve;

FIG. 3 is a vertical section of the sleeve in position in an assembled joint; and FIG. 4 is a partial section of a sleeve showing a further sealing rib configuration.

DETAILED DESCRIPTION OF THE INVENTION

From FIG. 1 it will be seen that the sleeve consists of a thin walled frusto-conical member 1 preferably made from sintered polytetrafluoroethylene, having an external annular rim 2 at the wider end thereof. The rim 2 has a knurled edge 3. For use in a standard type joint in 24 mm internal diameter glass tubing, the sleeve will have a value of approximately 2°52′ for the included angle $\alpha$, 30 mms for the length $x$, and a wall thickness of approximately 0.25mms. The sleeve is provided with the internal sealing ribs 4 and 5 which are of semi-circular cross-section and have a depth of approximately 0.25 mms. The ribs 4 and 5 provide an effective grease free joint which is capable of being subjected to comparatively high vacuum, e.g. less than $10^{-2}$ mms Hg, and high temperatures, e.g. up to 200°C.

The inner surface of the rim at the wider end of the sleeve may also be provided with a circumferential sealing rib 6, although this is optional.

In a particularly preferred form of the sleeve of FIG. 1, the rim at the narrow end is also thickened, this time on the inner surface of the wall, to provide the annular thickening 7 shown in FIG. 2. It is preferred that this thickening be of squared profile rather than rounded profile having its inner surface approximately parallel with the sleeve wall. Typically this thickening is of the same depth as the sealing ribs 4 and 5 which are shown, in this case having a trapezoidal cross-section.

In use, the sleeve is either inserted into the socket 12 of the female part 11 of the joint (shown in FIG. 3) or is placed over the tapered tip 10 of the male part 9 of the joint. The parts 9 and 11 may be merely the ends of glass or like tubes or may be side arms extending from more complex pieces of apparatus, e.g. the side arms of reaction flasks or the like. The male part is then inserted into the socket of the female part and the two parts pushed home to provide the assembled joint. In pushing the parts home, the sealing rib 5 is compressed between the exterior of the tapered tip 10 and the interior of the socket. The step 8 on shoulder 7 prevents tip 10 being pushed too far through sleeve 1 and thus reduces the risk of the sleeve being splayed and rendered less effective.

The sleeves of the invention find especial use as the interface between the male and female parts of ground glass tapered joints in laboratory or like glass ware.

From a further aspect, the present invention also provides an assembled male/female push fit type tapered joint in glassware provided with a sleeve of the invention located between the co-operating faces of the male and female parts of the joint.

I claim:

1. In an open ended conical sleeve member having a wall thickness of from 0.1 to 1.5 mm and suitable for use as a sealing interface between the co-operating mating surfaces of a tapered male/female push fit type glassware joint, the improvements which comprise:

said sleeve having a substantially smooth exterior surface;

at least two generally circumferential ribs integral with the interior surface of said sleeve member;

an external integral annular flange positioned at the broader end of said sleeve member and extending radially outwardly therefrom, whereby said sleeve member may be gripped during assembly and dismantling of a joint incorporating the sleeve member;

said sleeve member, said generally circumferential ribs and said annular flange being constructed from a material having a static coefficient of friction of less than 0.2, having a modulus of elasticity in the range of $80 \times 10^3$ to $200 \times 10^3$ at 23°C, having a hardness as measured on the Shore D scale of from 50 to 80, being resistant to thermal degradation at temperatures up to 200°C and being resistant to structural degradation when immersed in a corrosive chemical for a period of 12 hours at 50°C.

2. The improved open ended frusto conical sleeve member as defined in claim 1, wherein said generally circumferential ribs have a semi-circular cross section.

3. The improved open ended frusto conical sleeve member as defined in claim 1, wherein said generally circumferential ribs have a triangular cross section.

4. The improved open ended frusto conical sleeve member as defined in claim 1, wherein said generally circumferential ribs have a trapezoidal cross section.

5. The improved open ended frusto-conical sleeve member as defined in claim 1, wherein said sleeve member, said generally circumferential ribs and said annular flange are made from sintered polytetrafluoroethylene.

6. The improved open ended sleeve as claimed in claim 1, wherein all said generally circumferential ribs are located intermediate and spaced from the ends of the sleeve.

7. The improved open ended frusto-conical sleeve member as defined by claim 1, wherein the depth of said ribs is approximately 0.25 mm.

8. The improved open ended frusto-conical sleeve member as defined in claim 1, wherein said sleeve member, at the narrower end thereof, has an interiorly thickened portion.

9. The improved open ended frusto-conical sleeve member as defined in claim 1, wherein said wall thickness is substantially uniform throughout the length of said sleeve member, exclusive of said ribs and said flange.

* * * * *